United States Patent
Dreier et al.

[11] Patent Number: 5,996,436
[45] Date of Patent: Dec. 7, 1999

[54] SINGLE-SHAFT OPERATING DEVICE FOR ACTUATING A SHIFT MECHANISM INCLUDING SHIFT INTERLOCK MEANS

[75] Inventors: Loren Christopher Dreier, Milford; Jeff Austin, Milan; Peter B. Hartig, Plymouth, all of Mich.

[73] Assignee: ZF Friedrichshafen AG, Friedrichshafen, Germany

[21] Appl. No.: 09/018,640

[22] Filed: Feb. 4, 1998

[51] Int. Cl.⁶ ................................................. B60K 20/04
[52] U.S. Cl. ................... 74/473.21; 74/473.25; 74/473.24; 74/473.37
[58] Field of Search .............. 74/473.21, 473.22, 74/473.24, 473.37, 473.25

[56] References Cited

U.S. PATENT DOCUMENTS

| | | | |
|---|---|---|---|
| 3,513,717 | 5/1970 | Lickey et al. | 74/477 |
| 4,307,624 | 12/1981 | Mylenek | 74/473.24 |
| 4,335,623 | 6/1982 | Kronstadt | 74/473.21 |
| 4,507,981 | 4/1985 | Hiraiwa et al. | 74/473.24 |
| 5,085,095 | 2/1992 | Lasoen | 74/473.3 |
| 5,285,694 | 2/1994 | Chene | 74/473.24 |
| 5,297,453 | 3/1994 | Chene | 74/473.24 |
| 5,309,785 | 5/1994 | Knape | 74/473.24 |
| 5,544,541 | 8/1996 | Kruizenga et al. | 74/473.24 |
| 5,743,147 | 4/1998 | Gazyakan | 74/478 |

FOREIGN PATENT DOCUMENTS

| | | |
|---|---|---|
| 0 395 241 | 10/1990 | European Pat. Off. . |
| 393021 | 10/1908 | France ...................................... 74/477 |
| 293488 | 8/1915 | Germany . |
| 4017957 | 12/1990 | Germany . |
| 58-189716 | 11/1983 | Japan ...................................... 74/477 |
| WO93/10377 | 5/1993 | WIPO . |
| WO 95/16869 | 6/1995 | WIPO . |

*Primary Examiner*—Tamara L. Graysay
*Assistant Examiner*—David Fenstermacher
*Attorney, Agent, or Firm*—Davis and Bujold

[57] ABSTRACT

An operating device for actuating the shift mechanism in multi-ratio transmissions in motor vehicles, incorporating a selector shaft (2) which is largely moveable in parallel to the gear axes and arranged in a transmission housing, this selector shaft (2) carrying coupling devices (14, 26, 32) which form a connection between the selector shaft (2) and shift forks (4, 6, 8, 56) or swing forks of the engaging gears. There is an interlock (34, 54) provided for blocking the shift forks (4, 6, 8, 56) or swing forks of the gears which are not to be engaged. This interlock (34, 54) is designed as a single shift interlock (34, 54) for all gears, which cannot be axially moved together with the selector shaft (2) but which can be rotated around the rotation axis (16) of the selector shaft (2) together with the selector shaft (2), the shift interlock (34, 54) having elements (62, 68, 78) which engage in the shift forks (4, 6, 8, 56).

6 Claims, 4 Drawing Sheets

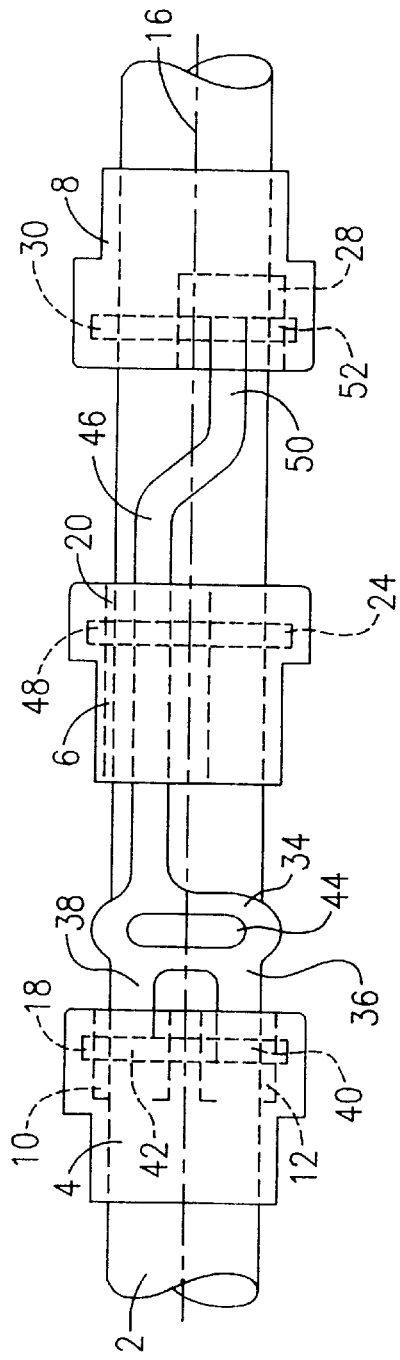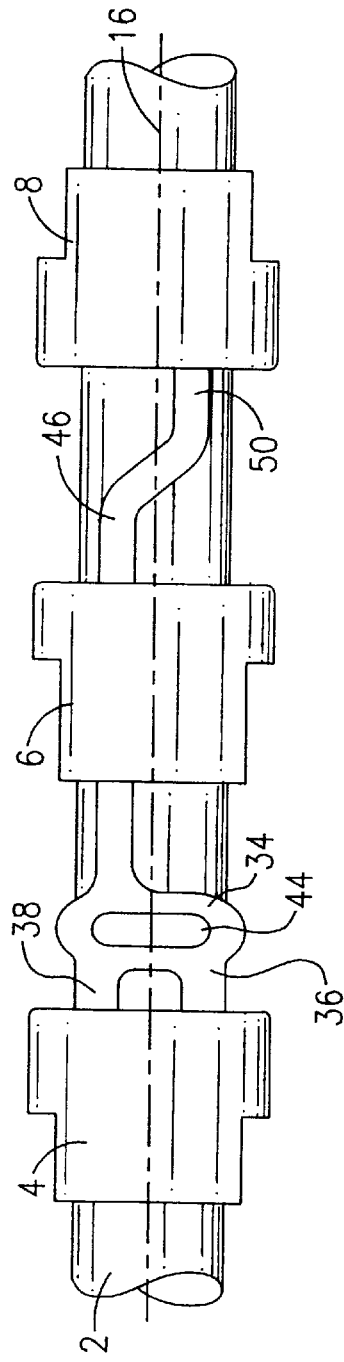

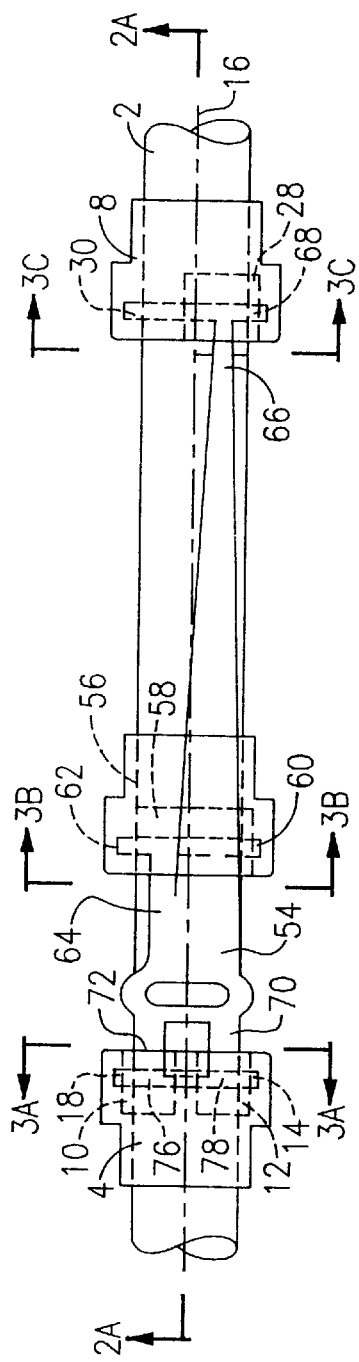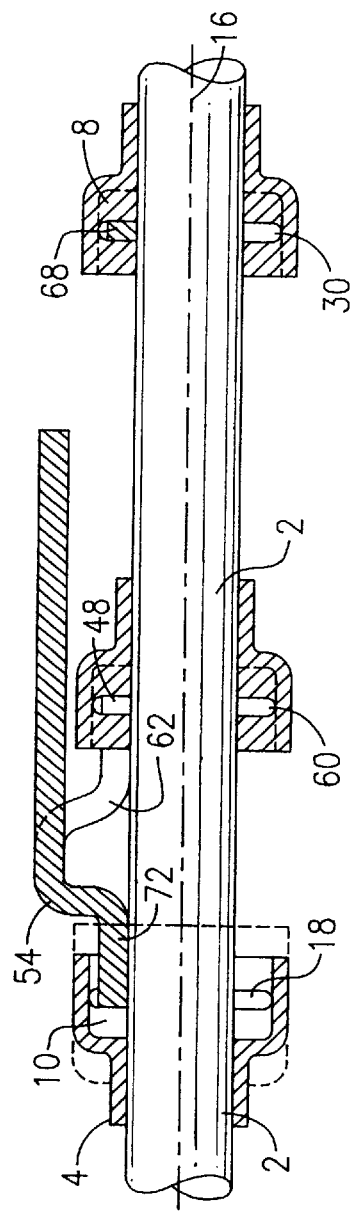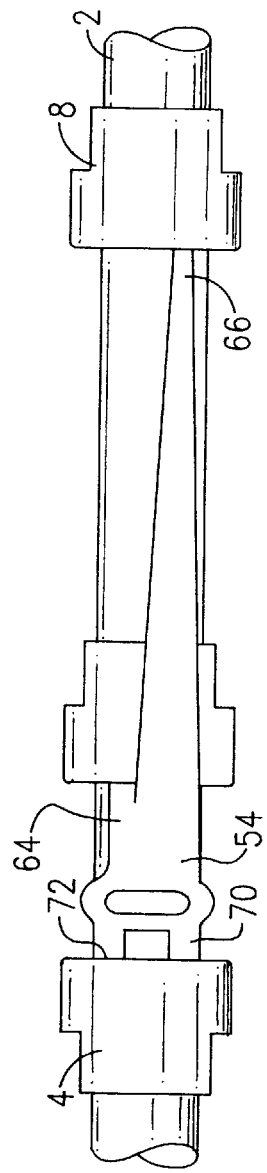

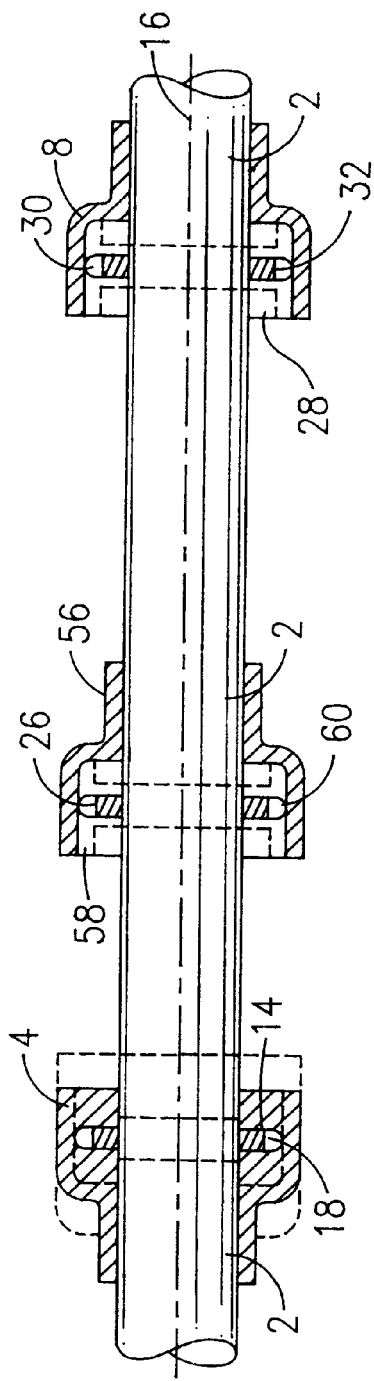
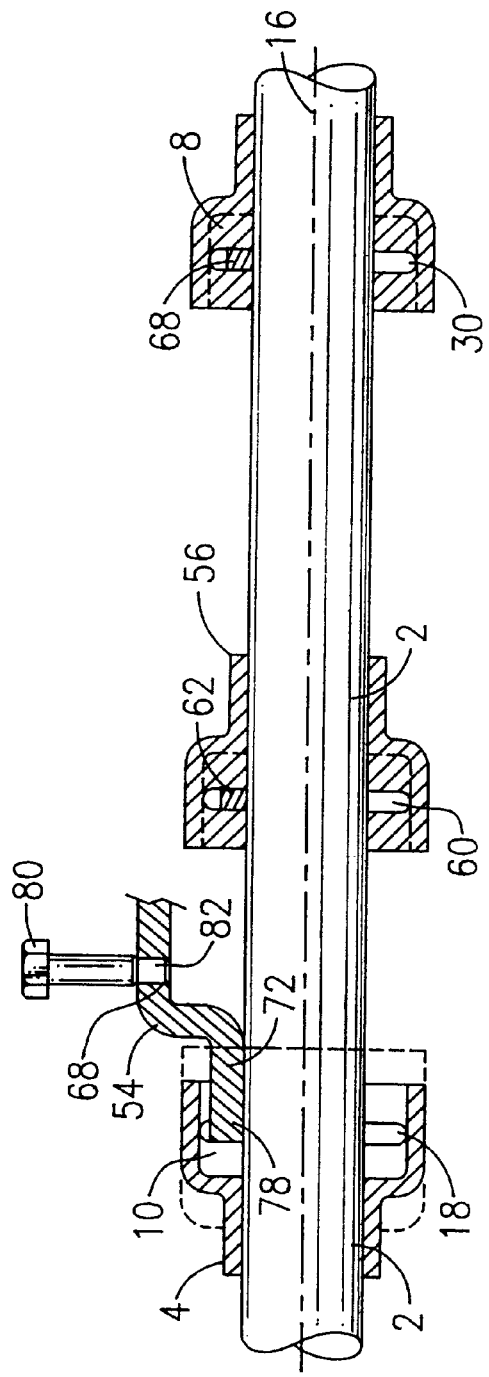

SINGLE-SHAFT OPERATING DEVICE FOR ACTUATING A SHIFT MECHANISM INCLUDING SHIFT INTERLOCK MEANS

PRIOR ART

An example of this type of operating device is already known from the international patent application WO 95/16869.

The above describes an operating device with single-shaft actuation, incorporating a selector shaft which can be displaced largely in parallel to the gear axis, this selector shaft being arranged in a transmission housing. The selector shaft carries coupling devices which form a link between the selector shaft and the shift forks or swing forks of the respective gear to be engaged. At the same time, the shift forks or swing forks of the gears not to be engaged are blocked.

This type of operating device has a number of components which are necessary to allow actuation of the engaging shift fork and, at the same time, to prevent actuation of the non-engaging shift forks. This number of components is costly and also requires high assembly expenditure.

OBJECT OF THE INVENTION

The invention is based on the task of further developing an operating device with single-shaft actuation in such a way that the component expenditure is reduced and the assembly of the operating device is made simpler.

SUMMARY OF THE INVENTION

According to the invention, the problem is solved by the fact that the operating device has a separate shift interlock detached from the selector shaft which only ensures that the non-engaging shift forks are locked. In this instance, the shift interlock cannot be axially moved together with the shaft but can be turned around the rotating axis of the selector shaft by means of the selector shaft, this shift element also having elements which engage with the shift forks or swing forks.

In an advantageous further development, the shift interlock fully engages with at least one of the shift forks or swing forks.

In another advantageous development, the shift interlock engages past the outside of at least one of the shift forks or swing forks.

Preferably, the shift forks or swing forks have a radial groove in which the elements of the shift interlock engage and in which they can rotate when the selector shaft is rotating. The shift interlock has an opening in which an element, for example a screw, engages, thus limiting the rotary motion of the shift interlock.

Preferably, the shift interlock is rotated by means of a crank rod.

BRIEF DESCRIPTION OF THE DRAWINGS

The invention is described, by way of example, in more detail, with reference to the accompanying drawings, in which:

FIG. 1 is a first advantageous layout in which a shift interlock passes through one shift fork;

FIG. 1A is a plan view of the first embodiment of the present invention;

FIG. 2 is a second advantageous layout in which a shift interlock passes around the shift fork;

FIG. 2A is a cross sectional view of the second embodiment of the present invention;

FIG. 2B is a plan view of the second embodiment of the present invention;

FIG. 4 is a cross-sectional view of the shift forks according to FIG. 2; and

FIG. 5 is a cross-sectional view of the shift forks according to FIG. 2.

DETAILED DESCRIPTION OF PREFERRED EMBODIMENTS

Figure 3C:
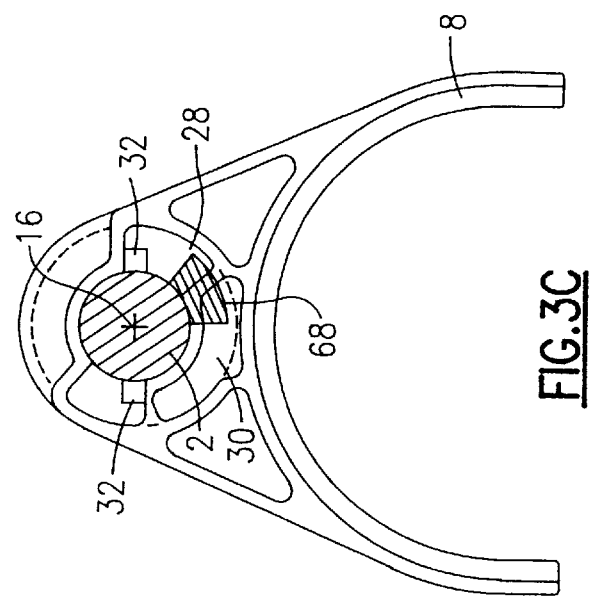
FIGS. 3A, B, C are cross-sectional views of the layout according to FIG. 2 on section lines IIIA, B and C.

FIG. 1 shows a side view of a selector shaft (2) for a transmission (not shown) on which three shift forks (4, 6, 8) are arranged. In the arrangement shown here, actuation of one shift fork (4) is shown. In this arrangement, the actuation corresponds to engagement of third or fourth gear. The shift fork (4) has two axial grooves (10, 12) which are open towards one end of the shift fork (4). A crank rod (14) which is permanently fixed to the selector shaft (2) engages in a circumferential groove (18) in the shift fork (4) in such a way that, in the arrangement shown, axial movement of the selector shaft (2) along the axis (16) moves the crank rod (14) along the axis (16) and causes axial displacement of the shift fork (4). The shift fork (6) has two axial grooves (20, 22), which stretch from one end of the shift fork (6) to the other end. The shift fork (6) also has a radial groove (24) in which a crank rod (26) can engage. The shift fork (8) has an axial groove (28) which is open towards one end of the shift fork (8). A crank rod (32) which is permanently fixed to the selector shaft (2) engages in the shift fork (8) in a circumferential groove (30). A shift interlock (34) which can be rotated together with the selector shaft (2) is arranged parallel to the axis (16). On one of its ends, this shift interlock (34) has two extensions (36, 38) which, in turn, each have a pin (40, 42) on the end. The pins (40, 42) are suitable for engaging in the radial groove (18) of the shift fork (4). In the arrangement shown here, they do not, however, engage in the circumferential groove (18) and, therefore, allow axial movement of the shift fork (4). The shift interlock (34) has a longitudinal opening (44) in which a locking element (not shown), for example a screw arranged in the transmission housing, can engage in order to prevent axial movement of the shift interlock (34). As a result, this permits limited rotation of the shift interlock (34) around the axis (16) but completely prevents axial movement of the shift interlock (34) along the axis (16).

The shift interlock (34), together with an extension (46), completely engages in the shift fork (6) and, at the same time, engages a pin (48) in the circumferential groove (24). As a result, axial movement of the shift fork (6) is blocked in this arrangement. The second end (50) of the shift interlock (34) engages in the axial groove (28) in the shift fork (8). The pin (52) arranged on the end (50) engages in the circumferential groove (30) and prevents the shift fork (8) from moving axially if the selector shaft (2) in the arrangement shown is moved axially.

FIG. 2 shows a further advantageous layout. FIG. 2 shows a side view of a selector shaft (2) for a transmission which is not shown on which three shift forks (4, 56, 8) are arranged. In the arrangement shown here, actuation of the one shift fork (4) is shown. In this arrangement, the actuation corresponds to engagement of third or fourth gear. The shift fork (4) has two axial grooves (10, 12) which are open towards one end of the shift fork (4). A crank rod (14) which is permanently fixed to the selector shaft (2) engages in a circumferential groove (18) in the shift fork (4) in such a way that, in the arrangement shown, axial movement of the selector shaft (2) along the axis 16) moves the crank rod (14) along the axis (16) and causes axial displacement of the shift fork (4). In this arrangement, the shift fork (56) has one axial groove (58) which is open towards one end of the shift fork (56). The shift fork (56) also has a circumferential groove (60) in which the crank rod (26) can engage. Here, the shift fork (8) has an axial groove (28) which is open towards one end of the shift fork (8). A crank rod (32) which is permanently fixed to the selector shaft (2) engages in a circumferential groove (30) in the shift fork (8). A shift interlock (54) which can be rotated together with the selector shaft (2) is arranged in parallel to the axis (16). On one of its ends, this shift interlock (54) has two extensions (70, 72) which, in turn, each have a pin (76, 78) on the end. The pins (76, 78) are suitable for engaging in the radial groove (18) in the shift fork (4). In the arrangement shown here, they do not, however, engage in the radial groove (18) and, therefore, allow axial movement of the shift fork (4). The shift interlock (54) has a longitudinal opening in which a locking element (not shown), for example, a screw arranged in the transmission housing, can engage in order to prevent axial movement of the shift interlock (54). As a result, this permits limited rotation of the shift interlock (54) around the axis (16) but completely prevents axial movement of the shift interlock (54) along the axis (16).

The shift interlock (54), together with an extension (64), completely engages in the shift fork (56) and, at the same time, engages in the circumferential groove (60) with a pin (62). As a result, axial movement of the shift fork (56) is blocked in this arrangement.

The second end (66) of the shift interlock (54) engages in the axial groove (28) in the shift fork (8). The pin (68) arranged on the end (66) engages in the circumferential groove (30) and prevents the shift fork (8) from moving axially if the selector shaft (2) in the arrangement shown is moved axially.

Figure 3B:
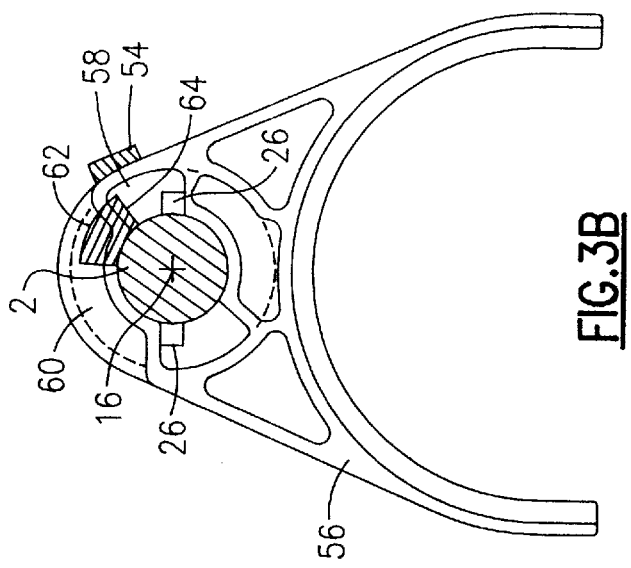
Figure 3A:
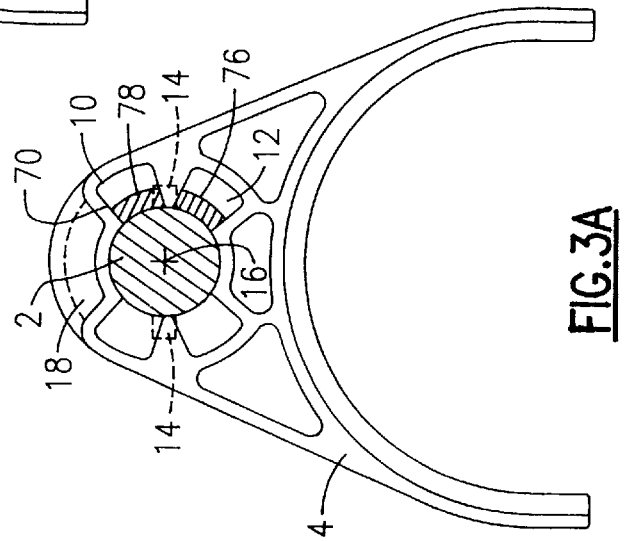

FIGS. 3A, B and C show the three shift forks according to FIG. 2 as seen along the axis (16). FIG. 3A shows the shift fork (4) which is arranged on the selector shaft (2) in such a way that the selector shaft (2) can be rotated within the shaft fork (4). Rotation of the selector shaft corresponds to selection of another shift gate by the driver. In the arrangement shown here, the crank rod (14) engages in the circumferential groove (18) in the shift fork (4) in such a way that axial movement of the selector shaft (2) also causes the shift fork (4) to move in an axial direction. The crank rod (14) is permanently fixed to the selector shaft (2) is rotated around the axis (16). The axial grooves (10, 12) contain both ends of the shift interlock (54), the pins (76, 78) of which engage in the circumferential groove (18). In the arrangement shown, according to FIG. 3A, the pins (76, 78) are positioned in such a way in the axial grooves (10, 12) that, when the selector shaft (2) is moved axially, the shift fork (4) is not hindered by the shift interlock and the shift fork (4) can be moved in an axial direction.

FIG. 3B shows the shift fork (56) which is arranged on the selector shaft (2) in such a way that the selector shaft (2) can be rotated within the shift fork (56). In the arrangement shown here, the crank rod (26) does not engage in the circumferential groove (60) in the shift fork (56), meaning that, when the selector shaft (2) is moved axially, the shift fork (56) is not moved axially. The crank rod (26) is permanently fixed to the selector shaft (2) and is also rotated when the selector shaft (2) is rotated around the axis (16). The axial groove (58) contains the extension (64 to the shift interlock (54), the pin (62) of which engages in the circumferential groove (60). In the arrangement shown, according to FIG. 3B, the pin (62) is arranged in such a way in the axial groove (58) that, when the selector shaft (2) is moved axially, the shift fork (56) is held in position by the shift interlock (54) and the shift fork (56) cannot be moved in an axial direction.

FIG. 3C shows the shift fork (8) which is arranged on the selector shaft (2) in such a way that the selector shaft (2) can be rotated within the shift fork (8). In the arrangement shown here, the crank rod (32) does not engage in the circumferential groove (30) in the shift fork (8), meaning that, when the selector shaft (2) is moved axially, the shift fork (8) is not moved axially. The crank rod (32) is permanently fixed to the selector shaft (2) and is also rotated when the selector shaft (2) is rotated around the axis (16). The axial groove (28) contains the end (66) of the shift interlock (54), the pin (68) of which engages in the radial groove (28). In the arrangement shown, according to FIG. 3C, the pin (68) is arranged in such a way in the axial groove (28) that, when the selector shaft (2) is moved axially, the shift fork (8) is held in position by the shift interlock (54) and the shift fork (8) cannot be moved in an axial direction.

FIG. 4 shows a cross-sectional view of the shift forks (4, 56, 8) for a shift into the third and fourth gear gate, in which only the arrangement of the shift forks (4, 56, 8) and crank rods (14, 26, 32) is shown. FIG. 4 shows the shift fork (4) which is arranged on the selector shaft (2). The crank rod (14) which is permanently fixed to the selector shaft (2), engages in the circumferential groove (18) in the shift fork (4) and, when the selector shaft (2) moves axially along the axis (16), displaces the shift fork (4). As a result, the shift fork (4) positions, indicated by the dotted lines are reached. The shift fork (56) is also arranged on the selector shaft (2). The crank rod (26), which is permanently fixed to the selector shaft (2), is located in the axial groove (58) in the shift fork (56) and, when the selector shaft (2) is moved axially along the axis (16), does not displace the shift fork (56). When the selector shaft (2) is axially displaced, the crank rod (26) positions, indicated by the shaded areas, are reached in each case. The shift fork (8) is also arranged on the selector shaft (2). The crank rod (32), which is permanently fixed to the selector shaft (2), is located in the axial groove (28) in the shift fork (8) and, when the selector shaft (2) is moved axially along the axis (16), does not displace the shift fork (8). When the selector shaft (2) is axially displaced, the crank rod (32) positions indicated by the shaded areas are reached.

FIG. 5 shows a cross-sectional view of the shift forks (4, 56, 8) for a shift into the third and fourth gear gate, in which only the arrangement of the shift forks (4, 56, 8) and the shift interlock (54) is shown. FIG. 5 shows the shift fork (4) which is arranged on the selector shaft (2). The pin (78) on the extension (72) of the shift interlock (54) engages in the axial groove (10) in the shift fork (4). When the selector shaft (2) is axially moved along the axis (16), the shift fork (4) can be displaced without hindrance by means of the shift interlock (54). A screw (80) which is connected to the transmission housing (not shown) here prevents axial movement of the shift interlock (54), since the tip (82) of the screw (80) engages in the opening (68) in the shift interlock (54). However, the screw (80) does allow rotation of the shift interlock (54) around the axis (16), since the tip (82) of the screw (80) in the opening (68) of the shift interlock (54) permits play in this direction. When the shift fork (4) is moved in an axial direction, the shift fork (4) positions indicated by the shaded areas are reached in each case. The shift fork (56) is also arranged on the selector shaft (2). The pin (62) on the shift interlock (54) engages in the circumferential groove (60) in the shift fork (56) and prevents the shift fork (56) from moving in an axial direction. The shift fork (8) is also arranged on the selector shaft (2). The pin (68) on the shift interlock (54) engages in the circumferential groove (30) in the shift fork (8) and prevents the shift fork (8) from moving in an axial direction.

When changing gear into another shift gate in the transmission, for example, from the shift gate for third and fourth gear indicated above into the shift gate for first and second gear, the procedure is as follows. Starting in the previously described shift gate, the selector shaft (2) is rotated through a certain angle. As a result, the crank rod (14) is rotated in the circumferential groove (18) in the shift fork (4) and engaged in the axial groove (10), thus allowing axial displacement of the crank rod (14) in the shift fork (4). At the same time, the crank rod (26) in the circumferential groove (60) in the shift fork (56) is also rotated and exists the axial groove (58). Along with the selector shaft (2), the shift interlock (54) is also rotated around the axis (16), and the pin (78) engages in the circumferential groove (18) in the shift fork (4) in such a way that axial displacement of the shift fork (4) is no longer possible. The pin (62) on the shift interlock (54) engages in the axial groove (58) in the shift fork (56) in such a way that it allows axial displacement of the shift fork (56). During this time, the crank rod (32) and the pin (68) on the shift interlock (54) in the circumferential groove (30) in the shift fork (8) also rotate around the axis (16). However, during this time, the crank rod remains in the axial groove (28), while the pin (68) does not reach the axial groove (28).

Following the rotation of the selector shaft (2), which corresponds to the selection of the shift gate by the driver, the selector shaft is then moved axially, which corresponds to engagement of the gear selected by the driver. During this time, the shift fork (56) is displaced axially by means of the crank rod (26), while the shift forks (4, 8) are held in their axial position by means of the shift interlock (54).

We claim:

1. An operating device for actuating a shift mechanism of a multi-ratio gear transmission for a motor vehicle, the operating device comprising:

the operating device defining an axis of rotation (16);

a selector shaft (2) being axially movable along and rotatable about the axis of rotation (16);

a plurality of shift forks (4, 6, 8, 56) being supported by the selector shaft (2);

a plurality of coupling devices (14, 26, 32) being carried by the selector shaft (2) for selectively coupling the selector shaft (2) to at least a desired one of the plurality of shift forks (4, 6, 8, 56); and a shift interlock (34, 54) for engaging at least one of the plurality of shift forks (4, 6, 8, 56) and for blocking engagement of a remaining portion of the plurality of shift forks (4, 6, 8, 56);

wherein the shift interlock (34, 54) is a single shift interlock (34, 54) which is restrained from axial movement along the axis of rotation (16) while the shift interlock (34, 54) is at least partially rotatable about the axis of rotation (16), and the shift interlock (34, 54) has engagement elements (62, 68, 78) which facilitate selective blocking of at least one of the plurality of shift forks (4, 6, 8, 56).

2. The operating device as set forth in claim 1, wherein the shift interlock (34, 54) includes a mechanism for restraining at least one of the plurality of shift forks (4, 6, 8, 56) from moving axially along said axis of rotation (16) during movement of said selector shaft (2).

3. The operating device as set forth in claim 1, wherein a portion of the shift interlock (34, 54) extends over an exterior portion of at least one of the plurality of shift forks (4, 6, 8, 56) so as to sandwich the at least one of the plurality of shift forks (4, 6, 8, 56) between the shift interlock (34, 54) and the selector shaft (2).

4. The operating device as set forth in claim 1, wherein each of the plurality of shift forks (4, 6, 8, 56) has a circumferential groove (18, 24, 30, 60) in which the engaging elements (62, 68, 78) of the shift interlock (34, 54) engage for blocking at least one of the plurality of shift forks (4, 6, 8, 56) from moving axially along said axis of rotation (16) during movement of said selector shaft (2).

5. The operating device as set forth in claim 1, wherein the shift interlock (34, 54) has an opening (44, 68) therein which receives a limiting element (80, 82) that prevents the shift interlock (34, 54) from moving axially along the axis of rotation (16) while allowing partial rotation of the shift interlock (34, 54) about the axis of rotation (16).

6. The operating device as set forth in claim 1, wherein a plurality of crank rods (14) are supported by the selector shaft (2), and the plurality of crank rods (14) engage with the shift interlock (34, 54) to facilitate rotation of the shift interlock (34, 54) about the axis of rotation (16).

* * * * *